3,331,835
NOVEL EPSILON-CAPROLACTAMS
Taghi G. Bassiri and Herbert K. Reimschuessel, Morristown, N.J., assignors to Allied Chemical Corporation, New York, N.Y., a corporation of New York
No Drawing. Filed Jan. 7, 1965, Ser. No. 424,123
2 Claims. (Cl. 260—239.3)

This invention relates to novel episilon-caprolactams and the preparation thereof. More particularly, this invention relates to epsilon-caprolactams which are substituted in the alpha position by phthalimido groups.

The compounds of the invention are useful as intermediates in the manufacture of DL-lysine, a recognized food supplement, and its corresponding alkyl-substituted derivatives. They are also believed to have sedative properties rendering them of interest in the pharmaceutical and veterinary fields.

The novel compounds of this invention have the formula:

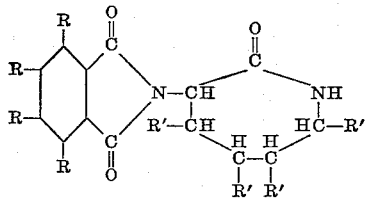

wherein R represents hydrogen or hydrocarbon radicals such as alkyl and aryl groups, preferably containing not more than 10 carbon atoms, and R' represents members selected from the group consisting of hydrogen and alkyl radicals, preferably having one to five carbon atoms, with at least two of the members represented by R' being hydrogen.

The above-defined compounds can be prepared by reacting an N-alkali metal phthalimide with an alpha-halogen-epsilon-caprolactam in accordance with the following equation:

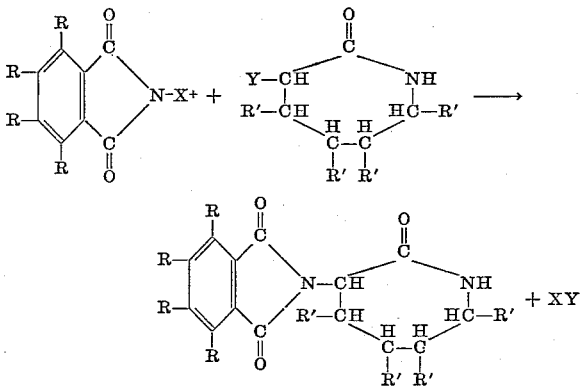

wherein R and R' have the meanings given above, X is an alkali metal selected from the group consisting of potassium, sodium, and lithium, and Y is a halogen selected from the group consisting of bromine, iodine, and chlorine. The reaction can be conducted without the use of a solvent if an admixture of the reactants is heated to a sufficient temperature to melt the alpha-halogen-epsilon-caprolactam. Typical melting points are 91°–93° C. for alpha-chloro-epsilon-caprolactam and 110°–111° C. for alpha-bromo-epsilon-caprolactam. The reaction temperature can be lowered to about 70° C. by dissolving the reactants in a solvent such as dimethylformamide. In general, it is not practical to conduct the reaction at a temperature of over about 200° C.

Suitable alkali metal salts for use in the present invention include potassium phthalimide, sodium phthalimide, lithium phthalimide, and the derivatives thereof substituted on the benzene ring with from one to four hydrocarbon radicals. Typical alpha-halogen-epsilon-caprolactams which can be employed in the present invention are:

alpha-bromo-epsilon-caprolactam;
alpha-bromo-beta-methyl-epsilon-caprolactam;
alpha-bromo-gamma-methyl-epsilon-caprolactam;
alpha-bromo-delta-methyl-epsilon-caprolactam;
alpha-bromo-epsilon-methyl-epsilon-caprolactam;
alpha-bromo-beta-ethyl-epsilon-caprolactam;
alpha-bromo-beta, gamma-dimethyl-epsilon-caprolactam;
alhpa-bromo-delta, epsilon-diethyl-epsilon-caprolactam;
alpha-bromo-beta-propyl-epsilon-caprolactam;
alpha-bromo-epsilon-butyl-epsilon-caprolactam;
alpha-bromo-delta-pentyl-epsilon-caprolactam;

and the corresponding alpha-iodo-epsilon-caprolactams and alpha-chloro-epsilon caprolactams.

At the completion of the reaction, the alkali metal halogen salt formed is separated from the desired alpha-phthalimido-epsilon-caprolactam. This can be conveniently accomplished by admixing the reaction product with hot chloroform to dissolve alpha-phthalimido-epsilon-caprolactam, filtering out the alkali metal halogen salt and then removing the chloroform by vacuum distillation. The alpha-phthalimido-epsilon-caprolactam can be further purified by recrystallization from methanol.

The alpha-phthalimido-epsilon-caprolactams of this invention can be converted to alpha-amino-epsilon-caprolactams by reaction with hydrazine in accordance with the following equation:

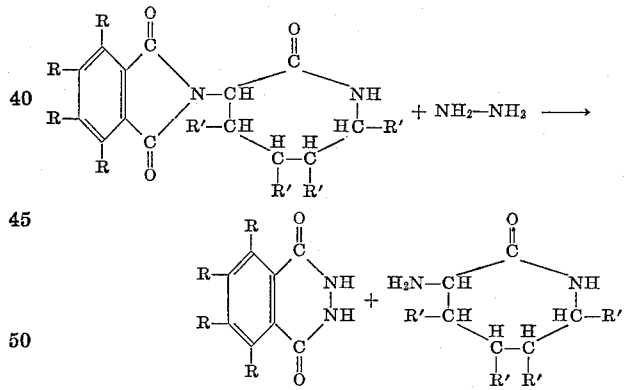

wherein R and R' have the meanings given above. This reaction can be conveniently conducted at the reflux temperature of the reaction mixture. In order to obtain a liquid reaction mixture, hydrazine can be employed in the form of hydrazine hydrate and the alpha-phthalimido-epsilon-caprolactam can be dissolved in an inorganic solvent such as methanol. The alpha-amino-epsilon-caprolactams can be readily hydrolyzed to DL-lysine and the alkyl substituted derivatives thereof. As it is well known, DL-lysine is an alpha-amino acid frequently used as a food supplement.

The following examples are given to further illustrate the invention, but it is to be understood that the invention is not to be limited in any way by the details described therein.

*Example 1*

Into a three-necked flask equipped with a thermometer and a stirrer were placed 18.2 grams (0.1 mole) of alpha-bromo-caprolactam and 18.5 grams (0.1 mole) of potassium phthalimide. The mixture was heated to 120° C. with stirring for 1.5 hours. Upon cooling to room temperature, 150 ml. of hot chloroform were added. The resulting solution was filtered and then the chloroform was removed under vacuum. The obtained yellowish green residue was purified by recrystallization from methanol and determined to be alpha-phthalimido-epsilon-caprolactam having a melting point of 266°–267° C.

*Analysis.*—Calculated for $C_{14}H_{14}O_3N_2$: C, 65.1%; H, 5.4%; N, 10.9%. Found: C, 65.2%; H, 5.41%; N, 10.7%.

The same product can be obtained if 0.1 mole of alpha-iodo-epsilon-caprolactam or alpha-chloro-epsilon-caprolactam are substituted for alpha-bromo-epsilon-caprolactam and/or 0.1 mole of sodium or lithium phthalimide is substituted for the potassium phthalimide. Additionally, if the alpha-bromo-epsilon-caprolactam is replaced by 0.1 mole of an alkyl-substituted derivative thereof falling within the scope of the previously defined formula and/or the potassium phthalimide is replaced by 0.1 mole of a hydrocarbon-substituted derivative thereof falling within the scope of the previously defined formula, a product is obtained containing alkyl substituents corresponding to those of the starting material.

The following example illustrates use of the products in the preparation of DL-lysine, etc. The phthalimidolactam of this example was prepared as described in the first paragraph of Example 1 above.

*Example 2*

2.5 grams of alpha-phthalimido-epsilon-caprolactam were dissolved in 50 ml. of methanol. To this solution were added 2 ml. of 85% hydrazine hydrate. The solution was refluxed for 24 hours. Upon cooling to room temperature, the solution was filtered and the alcohol removed under vacuum. The residue was dissolved in chloroform and filtered. The residue obtained after removal of the chloroform was crystallized from hexane and determined to be alpha-amino-epsilon-caprolactam.

In a similar manner the substituted alpha-phthalimido-epsilon-caprolactams described in Example 1 can be reacted with hydrazine hydrate to obtain products having corresponding substituents on their ring structure.

It will be apparent that many modifications and variations may be effected without departing from the scope of the novel concepts of the present invention, and the illustrative details disclosed are not to be construed as imposing undue limitations on the invention.

We claim:

1. A compound of the formula:

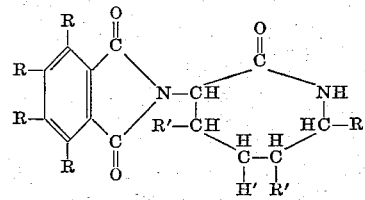

wherein R is a radical selected from the group consisting of hydrogen, and alkyl and aryl of from 1 to 10 carbon atoms and R' is a radical selected from the group consisting of hydrogen and alkyl of from 1 to 5 carbon atoms with at least two of the members represented by R' being hydrogen.

2. Alpha-phthalimido-epsilon-caprolactam.

References Cited

Hickinbottom: "Reactions of Organic Compounds," pp. 256–58 (Longmans Green) (1948).

WALTER A. MODANCE, *Primary Examiner.*

ROBERT T. BOND, *Assistant Examiner.*